United States Patent [19]

Hamm

[11] Patent Number: 5,180,597
[45] Date of Patent: Jan. 19, 1993

[54] PROCESS FOR THE PRODUCTION OF HYDROLYZED VEGETABLE PROTEINS USING GASEOUS HYDROCHLORIC ACID AND THE PRODUCT THEREFROM

[75] Inventor: Donald J. Hamm, New Providence, N.J.

[73] Assignee: CPC International Inc., Englewood Cliffs, N.J.

[21] Appl. No.: 641,037

[22] Filed: Jan. 14, 1991

[51] Int. Cl.$^5$ .............................................. A23J 3/14
[52] U.S. Cl. ......................................... 426/52; 426/63; 426/474; 426/656
[58] Field of Search ..................... 426/32, 52, 63, 474, 426/656

[56] References Cited

U.S. PATENT DOCUMENTS

| | | | |
|---|---|---|---|
| 3,830,942 | 8/1974 | Hawley | 426/190 |
| 4,452,888 | 6/1984 | Yamazaki et al. | 426/32 |
| 4,636,388 | 1/1987 | Lin et al. | 426/7 |
| 4,665,158 | 5/1987 | Armanet et al. | 530/357 |
| 4,757,007 | 7/1988 | Satoh et al. | 435/69 |

FOREIGN PATENT DOCUMENTS 442800 5/1975 U.S.S.R.

Primary Examiner—Jeanette Hunter
Assistant Examiner—Helen Pratt

[57] ABSTRACT

A process for the production of hydrolyzed vegetable proteins containing no detectable level of monocholorodihydroxypropanol and substantial flavor enhancement characteristics by using enzymatic hydrolysis of the protein followed by mild acid hydrolysis with gaseous hydrochloric acid and the product therefrom.

26 Claims, No Drawings

PROCESS FOR THE PRODUCTION OF HYDROLYZED VEGETABLE PROTEINS USING GASEOUS HYDROCHLORIC ACID AND THE PRODUCT THEREFROM

BACKGROUND OF THE INVENTION

1. Field of the Invention

This invention relates to a process for the production of hydrolyzed vegetable proteins, containing no detectable levels of monochlorodihydroxypropanol. The resultant hydrolyzed vegetable protein is clean and bland in flavor and exhibits substantial flavor enhancement characteristics.

2. Description of the Prior Art

The preparation of conventional hydrolyzed vegetable proteins (HVPs) is generally carried out by acid hydrolysis with hydrochloric acid under refluxing conditions, specifically using 6M hydrochloric acid at 109° C. and atmospheric pressure. It has been demonstrated that hydrolyzing vegetable proteins at these conditions results in the chlorination of glycerol, which is derived from the residual fatty substances present in the crude protein, to produce monochlorodihydroxypropanols (MCDPs) and dichloropropanols (DCPs). As MCDPs and DCPs exhibit questionable properties and characteristics, their presence is not desired in food products. DCPs are readily removed during the evaporation or concentration steps of standard processes. Unfortunately, MCDPs are not removed, but are concentrated in the finished product, and therefore, additional processing steps must be taken to remove the MCDPs from the finished product.

In a conventional acid hydrolysis process for preparing HVPs, the formation of MCDPs and DCPs can be avoided by using sulfuric or phosphoric acid in place of hydrochloric acid. However, the HVPs produced by hydrolyzing with sulfuric or phosphoric acid are of an inferior quality in that they exhibit a bitter flavor.

The specific problem is that MCDP is derived during conventional acid hydrolysis from the chlorination of the glycerol derived from the residual fatty substances which are present in crude proteins. As an example, vital wheat gluten which is approximately 75% protein, also contains 5.0 to 9.5% fat and other lipid materials, is an abundant source of glycerol in the form of a complex mixture of mono-, di- and tri-glycerides, phospholipids and glycolipids. Numerous factors which are believed to effect the formation of MCDP include the presence of high concentrations of chloride ions, high amounts of excess acid, high refluxing temperatures and long reaction times. It is thought that the bound glycerol is more active in forming MCDPs than unbound glycerol.

Much is also known about the use of enzymes to hydrolyze vegetable proteins for food use, but not for the purpose of flavor enhancement. What is taught in the existing art is generally directed toward producing functionally improved proteins, such as eliminating bitter peptide formation during enzyme hydrolysis as shown in U.S. Pat. No. 4,636,388. Specifically, the patent discloses a low ash protein product which is particularly adapted for enzymatic hydrolysis. A dispersion of protein is gelled and then washed in particulate form in a liquid in order to allow a portion of the non-proteinaceous material to defuse from the gel into the liquid, and then the liquid is separated from the gel. The pretreated product is then hydrolyzed enzymatically, preferably with fungal protease and pancreatin.

U.S. Pat. No. 4,757,007, discloses and claims a process for the preparation of hydrolyzed products of soy protein by partially hydrolyzing soy protein with protease, and then separating the resulting hydrolyzed products by using a 5% aqueous solution of trichloroacetic acid. The portion of hydrolyzed protein with low solubility possesses excellent emulsifying properties, while the one with high solubility possesses excellent foaming properties.

In U.S. Pat. No. 3,830,942, a soluble protein product is produced which is particularly useful in highly acidic foods, and an insoluble protein product is prepared which is used in preparing protein enriched bakery goods. The patent discloses the method for producing the two products by forming an aqueous solution of defatted oleaginous seed materials, adjusting the pH of the slurry to the isoelectric point of the seed materials, heating the slurry to elevated temperatures, adding an enzyme to the slurry, agitating the mixture during hydrolysis of the material and thereafter, separating the hydrolyzed and unhydrolyzed portions of the protein product.

In U.S. Pat. No. 4,665,158 to Armamet et al., a process is disclosed for hydrolyzing dehydrated protein materials with gaseous hydrochloric acid. Partial hydrolysis is achieved by the process when a protein material is impregnated with hydrochloric acid and left to rest at a selected temperature until the desired degree of hydrolysis is obtained. If complete hydrolysis is desired, then the protein-hydrochloric acid combination is subjected to heat under pressure in an autoclave.

Although enzyme hydrolysis and acid hydrolysis are generally separate procedures, one reference has been found which discloses the combination of acid and enzyme hydrolysis to obtain a protein hydrolyzate. In USSR Patent Application No. 442800, a method of obtaining a preparation for parenteral protein feeding is taught. A method is disclosed wherein the raw protein material undergoes enzymatic cleavage, followed by acid hydrolysis with 5.0% sulfuric acid (4.0N), in a carbon dioxide atmosphere. Thereafter, the hydrolyzate is passed through an anion exchange column, treated with aluminum hydroxide and passed through a column containing cation exchange resin. The acid hydrolysis takes place at about 100° C. for about seven (7) hours.

Many attempts have been made over the years to produce hydrolyzed vegetable protein products which are used for various purposes, however, to date no process has been taught which produces a hydrolyzed vegetable protein with reduced or non-existent levels of MCDP or DCP due to preventing MCDP and DCP production by controlling the parameters of the acid hydrolysis, and which exhibits substantial flavor enhancement characteristics.

SUMMARY OF THE INVENTION

The present invention relates to the production of hydrolyzed vegetable proteins which contain no detectable levels of MCDP. This result is achieved by a unique process which combines two methods of hydrolysis of the vegetable protein, enzymatic hydrolysis followed by mild acid hydrolysis with gaseous hydrochloric acid. The hydrolyzates which result from this process are clean and bland in flavor, exhibit substantial flavor enhancement characters, and contain substantial amounts of monosodium glutamate, up to 36% w/w of the starting protein.

The production of hydrolyzed vegetable proteins with no detectable level of MCDP begins with the hydrolyzing of the protein by adding it to an aqueous solution of at least one protease. The resulting hydrolyzed soluble protein is then separated from the insoluble mass. Thereafter, gaseous hydrochloric acid is added and the mixture is heated, providing an acidified hydrolyzate, which is then neutralized.

It is believed that the enzyme hydrolysis step contributes to reducing the MCDP and DCP formation by solubilizing the protein away from the majority of the non-proteinaceous components of the crude protein. This is believed to result in a significant reduction in the level of available glycerol containing fatty substances and thereby reduces the level of key substrates required for MCDP formation during the subsequent acid hydrolysis step. Another function of the enzyme hydrolysis is to act on the protein to release small peptides and amino acids.

The acid hydrolysis step also contributes to the decrease in MCDP level, as it is gaseous hydrochloric acid which is used. The conditions at which the acid hydrolysis, or deamidation take place, are significantly milder than those used in conventional processes, and at a lower moisture content. Specifically, the acid hydrolysis is carried out at significantly lower acid concentrations, at lower temperatures, at lower moisture contents and for shorter periods of time than the conventional hydrolysis process. By controlling the conditions, deamidation preferentially occurs; i.e., the amide linkages are hydrolyzed, but the peptide bond hydrolysis is controlled or minimized. It is believed that these conditions, combined with the reduced fat levels from the enzyme hydrolysis, are responsible for the lack of formation of MCDPs in the finished product.

DETAILED INVENTION

The present process comprises a number of steps for the hydrolyzing of a protein to a product which contains no detectable level of MCDP. The term "no detectable level" as used herein means that there is no detectable level as measured by gas chromotagraphy (GC) with a sensitivity to levels as low as 1 ppm.

According to the process, a vegetable protein is hydrolyzed by adding it to an aqueous solution of at least one protease. The protein can be any one of the available proteins, such as, but not limited to, oil seed proteins (soy, peanut, sunflower, cotton seed), leaf proteins, grain proteins, or any combination thereof. The preferred protein for producing savory flavors with substantial flavor enhancing properties is wheat gluten, due to its high glutamic acid content, present mostly as glutamine.

The protein is added to an aqueous solution of at least one endoprotease, which can be acidic, neutral or alkaline in form. The protease is chosen dependent upon a number of parameters for the particular enzyme/substrate combination, such as a) what the proper pH would be for the optimum proteolytic activity; b) the peptide bond specificity, which is best suited to meet the end product requirements; and c) whether or not the substrate requires debittering. The preferred enzyme for the protein wheat gluten is a neutral endoprotease, specifically Prozyme 6 (Amano International Enzyme, Troy, Va.).

The enzyme hydrolysis of the protein occurs at a temperature of from about 25° to about 75° C. and at a pH of from about 5.5 to about 8.5, with a neutral enzyme present in the amount of from about 0.1% to about 2.0% by weight of the substrate. Again, these conditions will vary depending on the protein-protease combination. For example, the pH is dependent upon the type of enzyme used. If an acidic enzyme is used, the pH will be in the range of from about 1.5 to about 4.0 and if an alkaline enzyme is used, the pH will be in the range of from about 7.0 to about 12.0. The present pH range is based on the use of a neutral protease.

For the preferred case of wheat gluten and Prozyme 6, a neutral protease, the enzyme hydrolysis is carried out at a temperature of from about 40° to about 50° C., preferably 45° C., and at a pH of from about 6.5 to about 7.0, with a preferred level from about 0.5% to 1.0% by weight Prozyme 6. The time during which the enzyme hydrolysis takes place is dependent upon quite a number of factors, specifically, the enzyme concentration used, the pH, the temperature of the reaction, the substrate level and the desired degree of hydrolysis. For the preferred embodiment, a time period of about four (4) hours is suggested.

The substrate level also plays an important role in the present process. The desired level is from about 1.0 to about 30% by weight of the total batch, with the preferred level from about 22 to about 26% by weight. These levels are exceptionally high, and generally cannot be achieved by conventional methods. In order to reach to desired levels, the substrate is added to the enzyme, instead of the conventional method of adding the enzyme to the substrate.

The enzyme hydrolysis is designed to accomplish a major portion of the peptide bond hydrolysis, which is necessary to release the flavor active peptides and amino acids. It does not release the glutamic acid, or monosodium glutamate, from glutamine, nor does it act on the amide bonds of the glutamine which is bound to the peptides. As stated above, quite a range of commercially available endoproteases and exoproteases may be used to achieve the desired result. Specific exoproteases, which contain leucine amino peptidase, may be used if it is desired to reduce the bitterness from hydrophobic peptides which are present in the hydrolyzed vegetable protein.

It must be pointed out that an endoprotease is absolutely necessary to carry out the initial enzyme hydrolysis. Therefore, if only one protease is used, it must be an endoprotease. If more than one enzyme is used to hydrolyze the vegetable protein the enzymes may be any combination of endoproteases and exoproteases, and they may be used either simultaneously or sequentially.

At this point, the enzymatic process may be stopped at the desired stage by the addition of acid to the aqueous solution. This step is not a necessary one, although it is part of the preferred process, and the hydrolyzed soluble protein can be separated from the insoluble mass without it. However, addition of a food grade organic or inorganic acid to bring the aqueous solution to a pH of from about 2.0 to about 4.0 will stop the enzymatic reaction, thereby providing precise control of the end point, and providing microbiological stability to the hydrolyzate. Addition of a food grade acid at the desired time will also provide for better separation of the hydrolyzed soluble protein from the insoluble mass. The acid may be added once the hydrolyzate has reached the desired degree of solubility and degree of hydrolysis. Specifically, the degree of solubility should, for economic reasons, be at least 60%, with a preferred level of at least 90%. The degree of hydrolysis should be in the range of from about 10 to about 70%, preferably about 20% to about 50%.

The hydrolyzed vegetable protein is then separated from the insoluble mass by any suitable, conventional method, such as filtration or centrifugation or combinations thereof.

Thereafter, the hydrolyzed soluble protein is concentrated or dried to lower the moisture content to a level of from about 25 to about 40% by weight. The resulting concentrate may be agglomerated, flaked, or dried on an inert but porous substrate in order to provide a large surface area for good contact with the gaseous hydrochloric acid.

Thereafter, the concentrated hydrolyzate is subjected to mild a gaseous acid hydrolysis by the addition of gaseous hydrochloric acid. This mild acid hydrolysis is designed to maximize deamidation of free amino acids and peptides and minimize the formation of pyroglutamic acid. This deamidation step is carried out at a temperature not to exceed 95° C. Since the reaction is exothermic, it may be necessary to provide a cooling means during this step to prevent overheating which might increase the risk of MCDP formation. The acidified hydrolyzate from the deamidation is then neutralized to a pH of from about 5.0 to about 7.0. Any number of known food grade bases can be used, but the preferred one is sodium hydroxide.

The resultant neutralized hydrolyzate may then be further processed, if desired, to get it into a more usable form. The hydrolyzate can be subjected to decolorization and deodorization processes. This is conventionally carried out by the use of activated carbon. The decolorized, deodorized hydrolyzate may then be concentrated. This can be performed by any number of methods currently known, such as spray drying, vacuum tray drying or evaporation, for example by a falling thin film evaporator.

During the mild acid deamidation, all the glutamine produced by the initial enzymatic process is converted to monosodium glutamate (MSG). Therefore, the amount of MSG present in the final product is substantially determined by the enzymatic process followed and the substrate used. For example, if wheat gluten is the vegetable protein in use and the enzymatic process goes to total conversion, the level of MSG in the final product can be as high as about 36% w/w of the starting protein.

The following are examples of the present invention, and are not meant to be limiting in any way:

EXAMPLE 1

Enzyme Hydrolysis

Each sample is subjected to enzyme hydrolysis in a New Brunswick scientific MICROFERM fermenter equipped with a 14 liter vessel and a standard configuration. The general procedure followed for conducting enzyme hydrolysis of wheat gluten is to first charge the reaction vessel with 65 to 90% of the total water to be charged. While the vessel is being brought up to temperature, the pH electrode is standardized and the autotitrator is charged with 4.0M sodium hydroxide. The titrator is set to the target pH and the enzyme solution (10% enzyme w/w in D.I. water) is prepared.

2400 grams of wheat gluten (Manildra Milling Corp., Shawnee Mission, Kans. 66205) are added to 24 grams of Prozyme 6 (Amano Enzymes, U.S. agent: Mitsubishi International Corp., New York, N.Y. 10022) in 7500 grams of water, over a period of 15 to 20 minutes with constant agitation. The enzymatic hydrolysis, maintained at pH 7 and at a temperature of 45° C., is allowed to proceed for 4 hours.

After 4 hours, the hydrolyzate is rapidly titrated to pH 2 with 20 Baume (10.0N) food grade hydrochloric acid (HCl). The acidified hydrolyzate is then pumped through tubing immersed in ice water into collection vessels and immediately refrigerated. The soluble phase is recovered by centrifuging the entire hydrolyzate for 15 minutes in a centrifuge at 6,000 xG, and the recovered supernate is set aside for deamidation.

Gaseous Deamidation

The gaseous deamidation is carried out on a bench scale in a glass chamber constructed from 6 inch diamter Kimax brand glass process pipe. A standard beaded compression coupling equipped with a teflon seal is used to hermetically seal the chamber during the reaction. The chamber is also equipped with inlets (with glass stopcocks) at each end to allow for flushing the chamber with an inert gas and to provide a port for monitoring reaction pressure and a means of pressure release in case excessive pressure builds up during the reaction.

To prepare the sample for deamidation, 50 glass fiber pads (4×4 in.; CEM Corporation, Indian Trail, N.C.; Cat No. 200150) are loaded with about 25 grams each of the soluble phase (containing about 20% solids, about 15% protein and about 0.75 moles of amide groups) from the enzyme hydrolysis. This represents a total sample load of 250 g/batch on a dry weight basis. The wet filters are then loaded into a special holder constructed of glass which is slotted to hold the filters in vertical position and separated from each other during the deamidation. The holder and wet filters are then placed in a vacuum oven at low heat (50°-70° C.) to reduce the moisture content of the suspended protein to about 30% (dry basis). The holder and dried enzyme hydrolyzate is then transferred to the reaction chamber described above and 100 mL (1.0 moles or a 25% excess relative to the amide content of the batch) of concentrated (36.5% w/w) food grade hydrochloric acid is placed in an open glass tray below the filter holder. The chamber is then sealed and flushed with dry nitrogen gas to substantially eliminate oxygen from the chamber. Once the chamber is flushed, it is placed in a standard laboratory forced air oven set at 95° C. where it is held for about 1 hour to affect the deamidation. At the end of the reaction, the chamber is removed from the oven and allowed to cool. The chamber is then again flushed with inert gas (into a suitable trap) to remove the excess gaseous hydrogen chloride to prepare the chamber to be opened safely.

The deamidated enzyme hydrolyzate is then collected by washing the filters with deionized water. The resultant acidic product is then neutralized with 4M NaOH and brought to a known weight with deionized water. The final hydrolyzate will contain substantial levels of MSG but no detectable level of MCDP.

What is claimed is:

1. A process for the production of hydrolyzed vegetable proteins containing no detectable level of monochlorodihydroxypropanol, which comprises:

(a) hydrolyzing a protein by adding it to an aqueous solution of at least one protease;

(b) separating the hydrolyzed soluble protein from any insoluble mass;

(c) concentrating the hydrolyzed soluble protein to a low moisture content;

(d) contacting the hydrolyzed soluble protein with gaseous hydrochloric acid for a period of not more than four (4) hours to substantially deamidate the hydrolyzate; and (e) neutralizing the deamidated hydrolyzate.

2. The process of claim 1 which further comprises addition of an acid to the aqueous solution in step (a) to stop the enzymatic reaction.

3. The process of claim 1 which further comprises deodorization and decoloration of the hydrolyzate from step (d).

4. The process of claim 3 which further comprises concentrating the deodorized and decolorized hydrolyzate.

5. The process of claim 1 wherein the protease in step (a) is an endoprotease.

6. The process of claim 5 wherein the endoprotease is acidic, neutral or alkaline.

7. The process of claim 1 wherein the protein in step (a) is chosen from the group consisting of oil seed proteins, leaf proteins, grain proteins and combinations thereof.

8. The process of claim 1 wherein the hydrolysis in step (a) takes place at a temperature of from about 25° to about 75° C. and a pH of from about 5.5 to about 8.5.

9. The process of claim 8 wherein the hydrolysis in step (a) takes place at a temperature of from about 40° to about 50° C. and a pH of from about 6.5 to about 7.0.

10. The process of claim 1 wherein the separation in step (b) is by filtration, centrifugation or combinations thereof.

11. The process of claim 1 wherein the hydrolyzate is concentrated to a moisture content of from about 25 to about 40% by weight.

12. The process of claim 1 wherein the reaction in step (d) takes place at a temperature of not more than about 95° C.

13. The process of claim 12 wherein the reaction in step (d) takes place at a temperature of about 95° C.

14. The process of claim 1 wherein the neutralization of step (d) takes place at a pH of from about 5.0 to about 7.0.

15. The process of claim 1 wherein the hydrolysis in step (a) is effected by the sequential addition of at least two proteases.

16. The process of claim 1 wherein the hydrolysis in step (a) is effected by the simultaneous addition of at least two proteases.

17. A process for the production of hydrolyzed proteins containing no detectable level of monochlorodihydroxypropanol, which comprises:

(a) hydrolyzing a protein by adding to an aqueous solution of at least one protease;

(b) adding an acid to the aqueous solution of step (a) to stop the enzymatic reaction;

(c) separating the hydrolyzed soluble protein from any soluble mass;

(d) concentrating the hydrolyzed protein from step (c) to a lower moisture content;

(e) contacting the hydrolyzed soluble protein with gaseous hydrochloric acid for a period of not more than four (4) hours to provide a deamidated hydrolyzate;

(f) neutralizing the deamidated hydrolyzate;

(g) decolorizing and deodorizing the hydrolyzate from step (f); and (h) concentrating the hydrolyzate from step (g).

18. The process of claim 17 wherein the protein in step (a) is chosen from the group consisting of oil seed proteins, plasma proteins, leaf proteins, grain proteins and combinations thereof.

19. The process of claim 18 wherein the protein in step (a) is wheat gluten.

20. The process of claim 17 wherein the deodorization and decolorization of step (g) is carried out by the use of activated carbon.

21. The process of claim 17 wherein the acid in step (b) is a food grade mineral acid.

22. The process of claim 21 wherein the food grade mineral acid is chosen from the group consisting of hydrochloric acid, phosphoric acid, sulphuric acid and combinations thereof.

23. The product of the process of claim 1.

24. The product of the process of claim 17.

25. A hydrolyzed vegetable protein which has no detectable level of monochlorodihydroxypropanol which is clean and bland in flavor and which exhibits substantial flavor enhancement characteristics.

26. The hydrolyzed vegetable protein of claim 25 which comprises substantial amounts of monosodium glutamate, up to about 36% w/w of the starting protein.

* * * * *